US009260319B2

(12) United States Patent
Bolt et al.

(10) Patent No.: US 9,260,319 B2
(45) Date of Patent: *Feb. 16, 2016

(54) PROCESS FOR IN-SITU FORMATION OF CHLORIDES IN THE PREPARATION OF TITANIUM DIOXIDE

(71) Applicant: CHEMOURS COMPANY TT LLC, Wilmington, DE (US)

(72) Inventors: John Davis Bolt, Kingston, TN (US); Eugene Michael McCarron, III, Chadds Ford, PA (US); Charles David Musick, Waverly, TN (US)

(73) Assignee: THE CHEMOURS COMPANY TT, LLC, Harrisburg, PA (US)

( * ) Notice: Subject to any disclaimer, the term of this patent is extended or adjusted under 35 U.S.C. 154(b) by 29 days.

This patent is subject to a terminal disclaimer.

(21) Appl. No.: 14/253,328

(22) Filed: Apr. 15, 2014

(65) Prior Publication Data

US 2014/0227168 A1 Aug. 14, 2014

Related U.S. Application Data

(62) Division of application No. 13/505,471, filed as application No. PCT/US2010/055921 on Nov. 9, 2010, now Pat. No. 8,734,756.

(60) Provisional application No. 61/384,864, filed on Sep. 21, 2010.

(51) Int. Cl.
*C01G 23/07* (2006.01)
*C01B 9/02* (2006.01)

(52) U.S. Cl.
CPC .. *C01G 23/07* (2013.01); *C01B 9/02* (2013.01)

(58) Field of Classification Search
CPC ................................. C01G 23/07; C01B 9/02
USPC .............. 423/612–614, 497–495, 597, 599.1, 423/499.3, 499.4
See application file for complete search history.

(56) References Cited

U.S. PATENT DOCUMENTS 2,488,439 A 11/1949 Schaumann
2,488,440 A 11/1949 Schaumann (Continued)

FOREIGN PATENT DOCUMENTS

DE 2159475 7/1982
DE 19650500 6/1998

(Continued)

OTHER PUBLICATIONS

Saepurahman et al. "Preparation and Characterization of Tungsten-Loaded Titanium Dioxide Photocatalyst for Enhanced Dye Degradation" Journal of Hazardous Materials, Elsevier, Amsterdam, NL, vol. 176 No. 1-3 XP027105005.

(Continued)

*Primary Examiner* — Anthony J Zimmer

(57) ABSTRACT

This disclosure relates to a process for producing titanium dioxide, comprising: a) reacting an alloy comprising a metal selected from the group consisting of aluminum, titanium and mixtures thereof, wherein either aluminum or titanium is a major component of the alloy, and an element selected from the group consisting of Li, Be, B, Na, Mg, Al, P, S, K, Ca, Sc, Ti, V, Cr, Mn, Fe, Co, Ni, Cu, Zn, Ga, Ge, As, Se, Rb, Sr, Y, Zr, Nb, Mo, Ru, Rh, Pd, Ag, Cd, In, Sn, Sb, Te, Cs, Ba, La, Ce, Pr, Nd, Sm, Eu, Gd, Tb, Dy, Ho, Er, Tm, Yb, Lu, Hf, Ta, W, Re, Os, Ir, Pt, Au, Hg, Tl, Pb, and Bi, with chlorine gas to form chlorides of aluminum, titanium or mixtures thereof and chlorides of the element selected from the group consisting of Li, Be, B, Na, Mg, Al, P, S, K, Ca, Sc, Ti, V, Cr, Mn, Fe, Co, Ni, Cu, Zn, Ga, Ge, As, Se, Rb, Sr, Y, Zr, Nb, Mo, Ru, Rh, Pd, Ag, Cd, In, Sn, Sb, Te, Cs, Ba, La, Ce, Pr, Nd, Sm, Eu, Gd, Tb, Dy, Ho, Er, Tm, Yb, Lu, Hf, Ta, W, Re, Os, Ir, Pt, Au, Hg, Tl, Pb, and Bi, at or above the boiling point of the chloride of the major component of the alloy; with the proviso that the element does not comprise Ti when the metal is Ti and does not comprise Al when the metal is Al; (b) adding titanium tetrachloride to the chlorides formed in step (a); (c) oxidizing the chlorides formed in step (a), and titanium tetrachloride of step (b); and (d) forming titanium dioxide dioxide comprising the oxide of aluminum and an oxide of an element selected from the group consisting of Li, Be, B, Na, Mg, Al, P, S, K, Ca, Sc, Ti, V, Cr, Mn, Fe, Co, Ni, Cu, Zn, Ga, Ge, As, Se, Rb, Sr, Y, Zr, Nb, Mo, Ru, Rh, Pd, Ag, Cd, In, Sn, Sb, Te, Cs, Ba, La, Ce, Pr, Nd, Sm, Eu, Gd, Tb, Dy, Ho, Er, Tm, Yb, Lu, Hf, Ta, W, Re, Os, Ir, Pt, Au, Hg, Tl, Pb, and Bi.

15 Claims, 1 Drawing Sheet

(56) References Cited

U.S. PATENT DOCUMENTS

| | | | |
|---|---|---|---|
| 2,559,638 | A | 7/1951 | Krchma |
| 2,833,627 | A | 5/1958 | Krchma |
| 3,208,866 | A | 9/1965 | Lewis et al. |
| 3,341,283 | A | 9/1967 | Cleaver et al. |
| 3,343,911 | A | 9/1967 | Eisenlohr |
| 3,356,456 | A | 12/1967 | Wilson |
| 3,378,338 | A | 4/1968 | Derham et al. |
| 3,434,799 | A | 3/1969 | Wilson |
| 3,485,583 | A | 12/1969 | Wilson |
| 3,505,091 | A | 4/1970 | Santos |
| 3,642,442 | A | 2/1972 | Hoekje et al. |
| 4,460,655 | A | 7/1984 | Jacobson |
| 5,204,083 | A | 4/1993 | Magyar et al. |
| 5,545,476 | A | 8/1996 | O'Dell et al. |
| 5,683,669 | A * | 11/1997 | Hartmann et al. ............ 423/491 |
| 6,328,944 | B1 | 12/2001 | Mangold et al. |
| 6,855,635 | B2 | 2/2005 | Schumacher et al. |
| 6,881,782 | B2 | 4/2005 | Crater et al. |
| 6,974,566 | B2 | 12/2005 | Sabacky et al. |
| 7,232,556 | B2 | 6/2007 | Yadav |
| 7,265,235 | B2 | 9/2007 | Auner |
| 7,449,245 | B2 | 11/2008 | Akarsu et al. |
| 7,476,378 | B2 | 1/2009 | Subramanian et al. |
| 8,734,756 | B2 * | 5/2014 | Bolt et al. ..................... 423/613 |
| 2004/0025749 | A1 | 2/2004 | Drews-Nicolai et al. |
| 2004/0137254 | A1 | 7/2004 | Schulz |
| 2005/0183634 | A1 | 8/2005 | Schumacher et al. |
| 2006/0263291 | A1 | 11/2006 | Torardi |
| 2007/0175364 | A1 | 8/2007 | Blumel et al. |
| 2007/0175365 | A1 | 8/2007 | Drews-Nicolai et al. |
| 2007/0298059 | A1 | 12/2007 | Tiedemann et al. |
| 2008/0064592 | A1 | 3/2008 | Kim et al. |
| 2008/0075654 | A1 | 3/2008 | Jamison |
| 2008/0241640 | A1 | 10/2008 | Rajeshwar et al. |
| 2008/0267852 | A1 | 10/2008 | Schumacher et al. |
| 2010/0226851 | A1 | 9/2010 | Kim et al. |

FOREIGN PATENT DOCUMENTS

| | | |
|---|---|---|
| EP | 1553054 A1 | 7/2005 |
| EP | 2186561 A1 | 5/2010 |
| GB | 760644 | 11/1956 |
| GB | 1358224 | 7/1972 |
| JP | 04130011 | 5/1992 |
| JP | 04170312 | 6/1992 |
| WO | WO02079572 | 10/2002 |
| WO | WO2005/113442 | 12/2005 |
| WO | WO2007/129903 | 11/2007 |

OTHER PUBLICATIONS

Hathway T et al, "Photocatalytic Degradation using Tungsten-Modified TI02 and Visible Light: Kinetic and Mechanistic effects using Multiple Catalyst Doping Strategies" Journal of Photochemistry and Photobiology, A: Chemistry, Elsevier Sequoia Lausanne, CH. vol. 207, No. 203, XP026614075.

C.R. Martens, R.E. Kreiger Publishing Co., p. 515, 1974, "Emulsion Paints)".

C.R. Martens, "Emulsion and Water Soluble Paints and Coatings" (Reinhold Publishing Cor., New York, NY 1965 pp. 1-15.

International Search Report, Jan. 3, 2011.

* cited by examiner

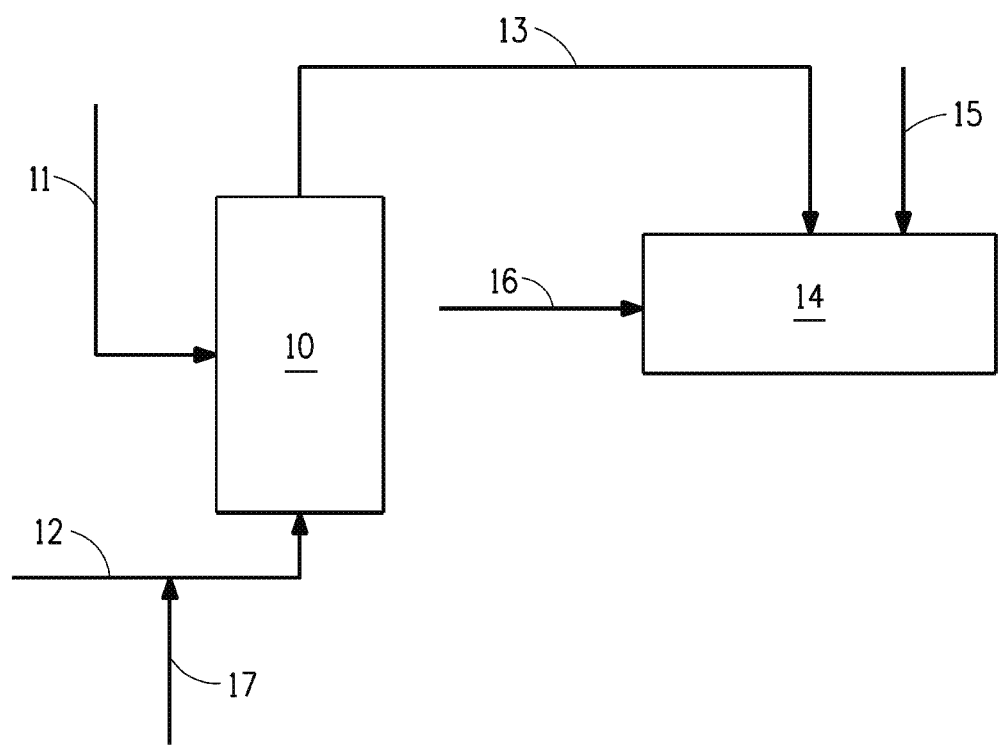

PROCESS FOR IN-SITU FORMATION OF CHLORIDES IN THE PREPARATION OF TITANIUM DIOXIDE

CROSS REFERENCE TO RELATED APPLICATIONS

This application is a divisional of Ser. No. 13/505,471 filed on Nov. 9, 2010 which claims the benefit of U.S. Provisional Application No. 61/384,864, filed Sep. 21, 2010, which are incorporated by reference in their entireties.

BACKGROUND OF THE DISCLOSURE

1. Field of the Disclosure

The present disclosure relates to a process for preparing titanium dioxide, and in particular to the in-situ formation of chlorides in the preparation of titanium dioxide.

2. Background of the Disclosure

Titanium dioxide pigments are prepared using either the chloride process or the sulfate process. In the preparation of titanium dioxide pigments by the vapor phase chloride process, titanium tetrachloride, $TiCl_4$, is reacted with an oxygen containing gas at temperatures ranging from about 900° C. to about 1600° C., the resulting hot gaseous suspension of $TiO_2$ particles and free chlorine is discharged from the reactor and must be quickly cooled below about 600° C., for example, by passing it through a conduit, i.e., flue, where growth of the titanium dioxide pigment particles and agglomeration of said particles takes place.

It is known to add various substances, such as silicon compounds and aluminum compounds, to the reactants in order to improve the pigmentary properties of the final product. Aluminum trichloride added during the process has been found to increase rutile in the final product, and silicon tetrachloride that becomes silica in the final product has been found to improve carbon black undertone (CBU), particle size and pigment abrasion. It is useful to be able to add elements to the titanium dioxide particles. However, the process and materials to be added to improve properties of the titanium dioxide particles may be hazardous.

A need exists for a low cost approach for adding elements to the process without the need for transportation of a highly toxic material, special processing equipment and expensive facilities. A need also exists for a process wherein the feed to the $AlCl_3$ generator can be continuous with no shutdown required for maintenance on the equipment.

SUMMARY OF THE DISCLOSURE

In a first aspect, the disclosure provides a process for producing titanium dioxide, comprising:

a) reacting an alloy comprising a metal selected from the group consisting of aluminum, titanium and mixtures thereof, wherein either aluminum or titanium is a major component of the alloy, and an element selected from the group consisting of Li, Be, B, Na, Mg, Al, P, S, K, Ca, Sc, Ti, V, Cr, Mn, Fe, Co, Ni, Cu, Zn, Ga, Ge, As, Se, Rb, Sr, Y, Zr, Nb, Mo, Ru, Rh, Pd, Ag, Cd, In, Sn, Sb, Te, Cs, Ba, La, Ce, Pr, Nd, Sm, Eu, Gd, Tb, Dy, Ho, Er, Tm, Yb, Lu, Hf, Ta, W, Re, Os, Ir, Pt, Au, Hg, Tl, Pb, and Bi, with chlorine gas to form chlorides of aluminum, titanium or mixtures thereof and chlorides of the element selected from the group consisting of Li, Be, B, Na, Mg, Al, P, S, K, Ca, Sc, Ti, V, Cr, Mn, Fe, Co, Ni, Cu, Zn, Ga, Ge, As, Se, Rb, Sr, Y, Zr, Nb, Mo, Ru, Rh, Pd, Ag, Cd, In, Sn, Sb, Te, Cs, Ba, La, Ce, Pr, Nd, Sm, Eu, Gd, Tb, Dy, Ho, Er, Tm, Yb, Lu, Hf, Ta, W, Re, Os, Ir, Pt, Au, Hg, Tl, Pb, and Bi, at or above the boiling point of the chloride of the major component of the alloy; with the proviso that the element does not comprise Ti when the metal is Ti and does not comprise Al when the metal is Al;

(b) adding titanium tetrachloride to the chlorides formed in step (a);

(c) oxidizing the chlorides formed in step (a), and titanium tetrachloride added in step (b); and (d) forming titanium dioxide comprising the oxide of aluminum and an oxide of an element selected from the group consisting of Li, Be, B, Na, Mg, Al, P, S, K, Ca, Sc, Ti, V, Cr, Mn, Fe, Co, Ni, Cu, Zn, Ga, Ge, As, Se, Rb, Sr, Y, Zr, Nb, Mo, Ru, Rh, Pd, Ag, Cd, In, Sn, Sb, Te, Cs, Ba, La, Ce, Pr, Nd, Sm, Eu, Gd, Tb, Dy, Ho, Er, Tm, Yb, Lu, Hf, Ta, W, Re, Os, Ir, Pt, Au, Hg, Tl, Pb, and Bi.

By "alloy" we mean a substance made by melting two or more elements together, at least one of them being a metal. An alloy crystallizes upon cooling into a solid solution, a homogeneous mixture, or an intermetallic compound.

BRIEF DESCRIPTION OF THE DRAWING

FIG. 1 is a schematic illustration showing the process for preparing titanium dioxide ($TiO_2$).

DETAILED DESCRIPTION OF THE DISCLOSURE

In the process of vapor phase oxidation of titanium tetrachloride to form titanium dioxide pigment treated with elements disclosed above, chlorides of said elements are formed in-situ by reacting an alloy comprising aluminum, titanium or mixtures thereof, wherein one metal is a major component of the alloy, and an element selected from the group consisting of Li, Be, B, Na, Mg, Al, P, S, K, Ca, Sc, Ti, V, Cr, Mn, Fe, Co, Ni, Cu, Zn, Ga, Ge, As, Se, Rb, Sr, Y, Zr, Nb, Mo, Ru, Rh, Pd, Ag, Cd, In, Sn, Sb, Te, Cs, Ba, La, Ce, Pr, Nd, Sm, Eu, Gd, Tb, Dy, Ho, Er, Tm, Yb, Lu, Hf, Ta, W, Re, Os, Ir, Pt, Au, Hg, Tl, Pb, and Bi; with chlorine gas at or above the boiling point of the chloride of the major component of the alloy, optionally in the presence of titanium tetrachloride. The titanium dioxide formed comprises the oxide of aluminum and an oxide of an element selected from the group consisting of Li, Be, B, Na, Mg, Al, P, S, K, Ca, Sc, Ti, V, Cr, Mn, Fe, Co, Ni, Cu, Zn, Ga, Ge, As, Se, Rb, Sr, Y, Zr, Nb, Mo, Ru, Rh, Pd, Ag, Cd, In, Sn, Sb, Te, Cs, Ba, La, Ce, Pr, Nd, Sm, Eu, Gd, Tb, Dy, Ho, Er, Tm, Yb, Lu, Hf, Ta, W, Re, Os, Ir, Pt, Au, Hg, Tl, Pb, and Bi.

More typically, the element is selected from the group consisting of Li, B, Na, Mg, Al, P, S, K, Ti, V, Cr, Mn, Fe, Co, Ni, Cu, Zn, Ga, Ge, Se, Rb, Zr, Nb, Mo, Ag, In, Sn, Sb, Cs, Ba, La, Ce, Ta, W, Pt and Au. Still more typically, the element is selected from the group consisting of B, Mg, Al, P, K, Ti, Zn, Ge, Rb, Zr, Nb, Cs, and W. The element does not comprise Ti when the metal is Ti and does not comprise Al when the metal is Al.

Some suitable alloys comprising aluminum, titanium or mixtures thereof and an element selected from the group consisting of Li, Be, B, Na, Mg, Al, P, S, K, Ca, Sc, V, Cr, Mn, Fe, Co, Ni, Cu, Zn, Ga, Ge, As, Se, Rb, Sr, Y, Zr, Nb, Mo, Ru, Rh, Pd, Ag, Cd, In, Sn, Sb, Te, Cs, Ba, La, Ce, Pr, Nd, Sm, Eu, Gd, Tb, Dy, Ho, Er, Tm, Yb, Lu, Hf, Ta, W, Re, Os, Ir, Pt, Au, Hg, Tl, Pb and Bi include:

Alloy 2017 comprises 94.8% aluminum, 4% copper, 0.7%, manganese, and 0.5% magnesium having the following physical properties:

| | |
|---|---|
| Density (lb/cu. in.) | 0.101 |
| Specific Gravity | 2.79 |
| Melting Point (Deg F.) | 960 |
| Modulus of Elasticity Tension | 10.5 |
| Modulus of Elasticity Torsion | 4 |

Alloy 3003 comprising: 98.6% aluminum, 1.2% manganese, 0.12% copper, and 0.08% other (total) having the following physical properties:

| | |
|---|---|
| Density (lb/cu. in.) | 0.099 |
| Specific Gravity | 2.73 |
| Melting Point (Deg F.) | 1190 |
| Modulus of Elasticity Tension | 11.4 |
| Modulus of Elasticity Torsion | 3.8 |

Alloy 5052 comprising 97.25% aluminum, 2.5% magnesium, 0.25% chromium having the following physical properties:

| | |
|---|---|
| Density (lb/cu. in.) | 0.097 |
| Specific Gravity | 2.68 |
| Melting Point (Deg F.) | 1130 |
| Modulus of Elasticity Tension | 10.2 |
| Modulus of Elasticity Torsion | 3.8 |

Grade 9 Ti alloy comprising: 94.6% titanium, 3.0% aluminium and 2.5% vanadium. This grade is a compromise between the ease of welding and manufacturing of the "pure" grades and the high strength of Grade 5. It is commonly used in aircraft tubing for hydraulics and in athletic equipment.

Typically, such alloys may comprise about 0.1% to about 40% of the element and more typically about 0.5% to about 20% of the element and most typically 1.0% to about 15%. The amount of the element is dependent on the specific element in the alloy.

As shown in FIG. 1, the alloy 11 and chlorine 12 are added to the generator 10. This reaction can occur in fluidized beds, spouting beds, packed beds, or plug flow reactors. The inert generator bed may comprise materials such as silica sand, glass beads, ceramic beads, $TiO_2$ particles, or other inert mineral sands. The alloy comprising aluminum, titanium or mixtures thereof and an element selected from the group consisting of Li, Be, B, Na, Mg, Al, P, S, K, Ca, Sc, Ti, V, Cr, Mn, Fe, Co, Ni, Cu, Zn, Ga, Ge, As, Se, Rb, Sr, Y, Zr, Nb, Mo, Ru, Rh, Pd, Ag, Cd, In, Sn, Sb, Te, Cs, Ba, La, Ce, Pr, Nd, Sm, Eu, Gd, Tb, Dy, Ho, Er, Tm, Yb, Lu, Hf, Ta, W, Re, Os, Ir, Pt, Au, Hg, Tl, Pb, and Bi, 11, reacts in the generator 10 according to the following equations such as:

$$Al_{12}W + 21Cl_2 \rightarrow 12AlCl_3 + WCl_6 + heat$$

$$Al_{(1-x)}K_x + (3/2-x)Cl_2 \rightarrow (1-2x)AlCl_3 + xKAlCl_4 + heat$$

$$Al_{(1-x)}Mn_x + (3/2-x/2)Cl_2 \rightarrow (1-3x)AlCl_3 + xMnAl_2Cl_8 + heat$$

These are just a few sample equations, and the disclosure is not expected to be limited to just these equations.

The heat of reaction from the chlorination of the aluminum or titanium metal helps provide sufficient heat to drive the kinetics of the reaction between chlorine and one or more of the other elements.

Titanium tetrachloride 17 may be present during this reaction to absorb the heat of reaction. The chlorides formed in the in-situ step 13 comprise chlorides of the elements and chlorides of aluminum such as aluminum trichloride, chlorides of titanium such as titanium tetrachloride or mixtures thereof. The temperature of the reaction of chlorine with the alloy should be below the melting point of the alloy but sufficiently high enough for the rate of reaction with chlorine to provide the required rate of chlorides to be mixed with the TiCl4

Typical amounts of chlorine used in step (a) are about 0.4% to about 20%, more typically about 2% to about 5%, by weight, based on the total amount of all reactants. Typical amounts of titanium tetrachloride are about 75% to about 99.5% added in step (a) and (b), more typically about 93% to about 98%, by weight, based on the total amount of all reactants.

Reaction temperatures are dependent of the metal and the elements present in the alloy. In one specific embodiment where the metal is Al the reaction occurs at temperature of above 190° C., more typically at temperature of about 250° C. to about 650° C., and most typically at temperatures of about 300° C. to about 500° C.

In one specific embodiment where the metal is Ti the reaction occurs at temperature of above 50° C., more typically at temperature of about 200° C. to about 1000° C., and most typically at temperatures of about 300° C. to about 500° C.

The chlorides formed in the in-situ step 13 flows into an oxidation reactor 14 and titanium tetrachloride 15 is then added to the chlorides, such that titanium tetrachloride is present in a major amount. Vapor phase oxidation of and titanium tetrachloride is disclosed, for example, in U.S. Pat. Nos. 2,488,439; 2,488,440; 2,559,638; 2,833,627; 3,208,866; 3,505,091; and 7,476,378. The reaction may occur in the presence of neucleating salts such as potassium chloride, rubidium chloride, or cesium chloride.

Such reaction usually takes place in a pipe or conduit, wherein oxygen 16, titanium tetrachloride 15 and the in-situ formed chlorides comprising chlorides of at least one of the above disclosed elements and chlorides of aluminum such as aluminum trichloride, chlorides of titanium such as titanium tetrachloride or mixtures thereof 13 are introduced at a suitable temperature and pressure for production of the titanium dioxide. In such a reaction, a flame is generally produced.

Downstream from the flame, the titanium dioxide produced is fed through an additional length of conduit wherein cooling takes place. For the purposes herein, such conduit will be referred to as the flue. The flue should be as long as necessary to accomplish the desired cooling. Typically, the flue is water cooled and can be about 50 feet (15.24 m) to about 3000 feet (914.4 m), typically about 100 feet (30.48 m) to about 1500 feet (457.2 m), and most typically about 200 feet (60.96 m) to 1200 feet (365.76 m) long.

EXAMPLES

Example 1

A mixture of 36.2% tungsten by weight in aluminum was heated under argon at 700° C. for ten hours. The product consisted predominantly of the aluminum tungsten intermetallic phase, $Al_{12}W$, with the remainder $Al_5W$ and Al, as determined by powder x-ray diffraction. The product was then reacted with elemental chlorine at 425° C. in a fluidized bed reactor to give a gaseous mixture of aluminum chloride and tungsten chloride. The mixture of metal chlorides is combined with gaseous titanium tetrachloride and is oxidized to form titanium dioxide.

Example 2

A mixture of 7.3% tungsten by weight in aluminum was heated under argon at 700° C. for ten hours. The product consisted of the aluminum tungsten intermetallic phase, $Al_{12}W$, with the remainder Al, as determined by powder x-ray diffraction. The product was then reacted with elemental chlorine at 425° C. in a fluidized bed reactor to give a gaseous mixture of aluminum chloride and tungsten chloride. The mixture of metal chlorides is combined with gaseous titanium tetrachloride and is oxidized to form titanium dioxide.

Example 3

Commercial alloy 3003 which comprises 98.6% aluminum, 1.2% manganese, 0.12% copper, and 0.08% other impurities was reacted with elemental chlorine at 425° C. in a fluidized bed reactor to give a gaseous mixture of primarily aluminum chloride and manganese chloride. The mixture of metal chlorides is combined with gaseous titanium tetrachloride and is oxidized to form titanium dioxide.

Examples 4-5-6

A commercial alloy consisting of aluminum and another metallic element, M, (see list below), is reacted with elemental chlorine at 425° C. in a fluidized bed reactor to give a mixture of $AlCl_3$ and $M^{+x}Cl_x$. The mixture of metal chlorides is combined with gaseous titanium tetrachloride and is oxidized to form titanium dioxide.

Ex. 4. Al(95)-Cu(4)
Ex. 5. Al(97)-Mg(3)
Ex. 6. Ti(94.5)-Al(3.0)-V(2.5) (Ti alloy: Grade 9)

What is claimed is:

1. A process for producing titanium dioxide, comprising:
   a) reacting an alloy comprising a metal selected from the group consisting of aluminum, titanium and mixtures thereof, wherein either aluminum or titanium is a major component of the alloy, and an element selected from the group consisting of Li, Be, B, Na, Mg, Al, P, S, K, Ca, Sc, Ti, V, Cr, Mn, Fe, Co, Ni, Cu, Ga, Ge, As, Se, Rb, Sr, Y, Zr, Nb, Mo, Ru, Rh, Pd, Ag, Cd, In, Sn, Sb, Te, Cs, Ba, La, Ce, Pr, Nd, Sm, Eu, Gd, Tb, Dy, Ho, Er, Tm, Yb, Lu, Hf, Ta, W, Re, Os, Ir, Pt, Au, Hg, Tl, Pb, and Bi, with chlorine gas to form chlorides of aluminum, titanium or mixtures thereof and chlorides of the element selected from the group consisting of Li, Be, B, Na, Mg, Al, P, S, K, Ca, Sc, Ti, V, Cr, Mn, Fe, Co, Ni, Cu, Ga, Ge, As, Se, Rb, Sr, Y, Zr, Nb, Mo, Ru, Rh, Pd, Ag, Cd, In, Sn, Sb, Te, Cs, Ba, La, Ce, Pr, Nd, Sm, Eu, Gd, Tb, Dy, Ho, Er, Tm, Yb, Lu, Hf, Ta, W, Re, Os, Ir, Pt, Au, Hg, Tl, Pb, and Bi, at or above the boiling point of the chloride of the major component of the alloy; with the proviso that the element does not comprise Ti when the metal is Ti and does not comprise Al when the metal is Al, wherein the alloy comprises about 0.1% to about 40% of the element, based on the total weight of the alloy;
   (b) adding titanium tetrachloride to the chlorides formed in step (a);
   (c) oxidizing the chlorides formed in step (a), and titanium tetrachloride added in step (b); and
   (d) forming titanium dioxide.

2. The process of claim 1 wherein titanium tetrachloride is present in step (a).

3. The process of claim 1 wherein the element is selected from the group consisting of Li, B, Na, Mg, Al, P, S, K, Ti, V, Cr, Mn, Fe, Co, Ni, Cu, Ga, Ge, Se, Rb, Zr, Nb, Mo, Ag, In, Sn, Sb, Cs, Ba, La, Ce, Ta, W, Pt and Au.

4. The process of claim 3 wherein the element is selected from the group consisting of B, Mg, Al, P, K, Ti, Ge, Rb, Zr, Nb, Cs, and W.

5. The process of claim 1 wherein the alloy comprises about 0.5% to about 20% of the element, based on the total weight of the alloy.

6. The process of claim 5 wherein alloy comprises about 1.0% to about 15% of the element, based on the total weight of the alloy.

7. The process of claim 1 wherein the reaction in step (a) occurs in a reactor selected from the group consisting of a fluidized bed reactor, spouting bed reactor, packed bed reactor, and a plug flow reactor.

8. The process of claim 7 wherein the reactor comprises materials selected from the group consisting of silica sand, glass beads, ceramic beads, and $TiO_2$ particles.

9. The process of claim 7 wherein the reaction step (c) further comprises the step of nucleating the reaction mixture of step (b) with nucleating salts.

10. The process of claim 9 wherein the nucleating salts are selected from the group consisting of potassium chloride, rubidium chloride, and cesium chloride.

11. The process of claim 1 wherein the amount of chlorine is about 0.4% to about 20% by weight, based on the total amount of all reactants in steps (a) and (b).

12. The process of claim 11 wherein the amount of chlorine is about 2% to about 5% by weight, based on the total amount of all reactants in steps (a) and (b).

13. The process of claim 1 wherein the amount of titanium tetrachloride is about 75% to about 99.5% by weight, based on the total amount of all reactants in steps (a) and (b).

14. The process of claim 13 wherein the amount of titanium tetrachloride is about 93% to about 98% by weight, based on the total amount of all reactants in steps (a) and (b).

15. The process of claim 1 wherein the titanium tetrachloride is present in a major amount in step (c).

* * * * *